UNITED STATES PATENT OFFICE.

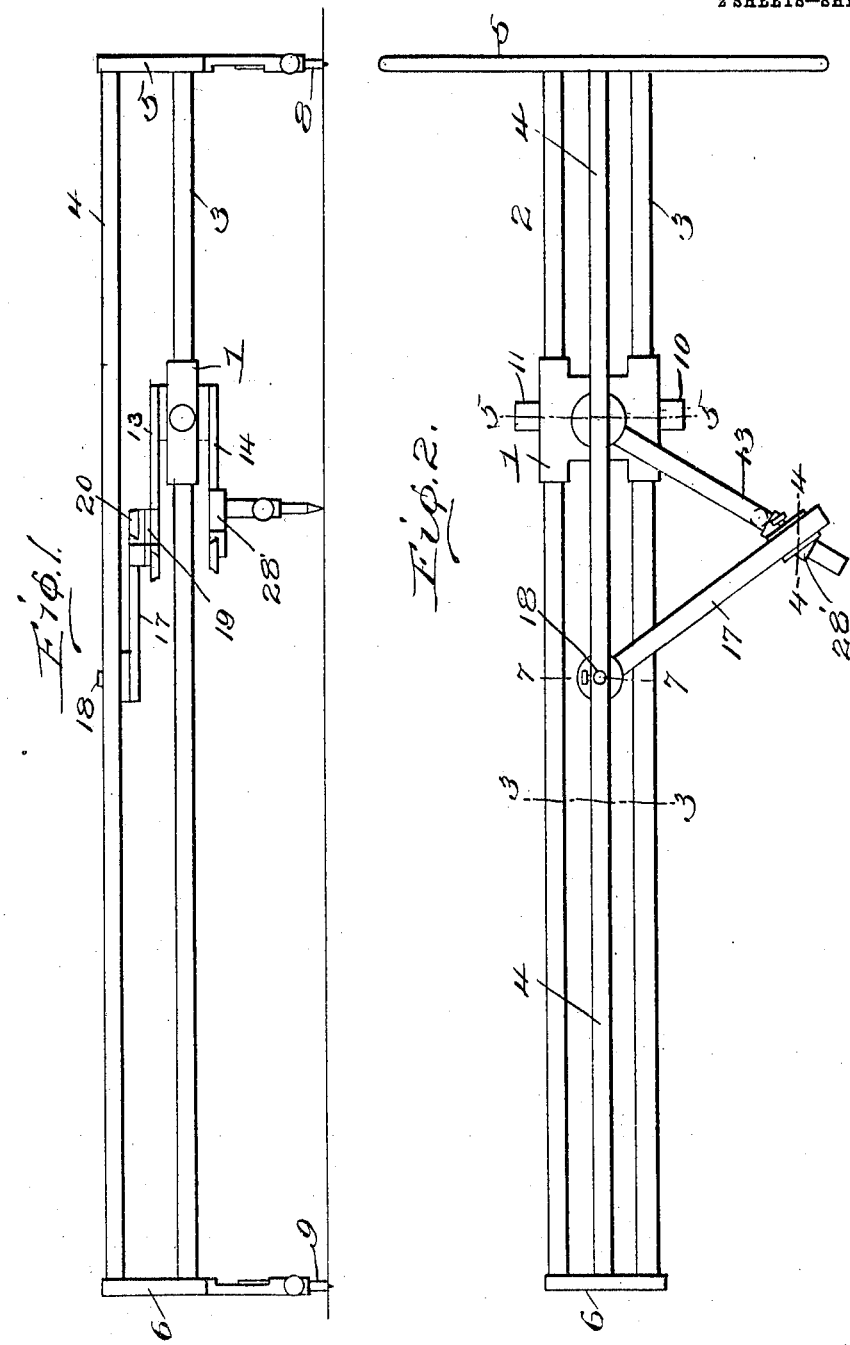

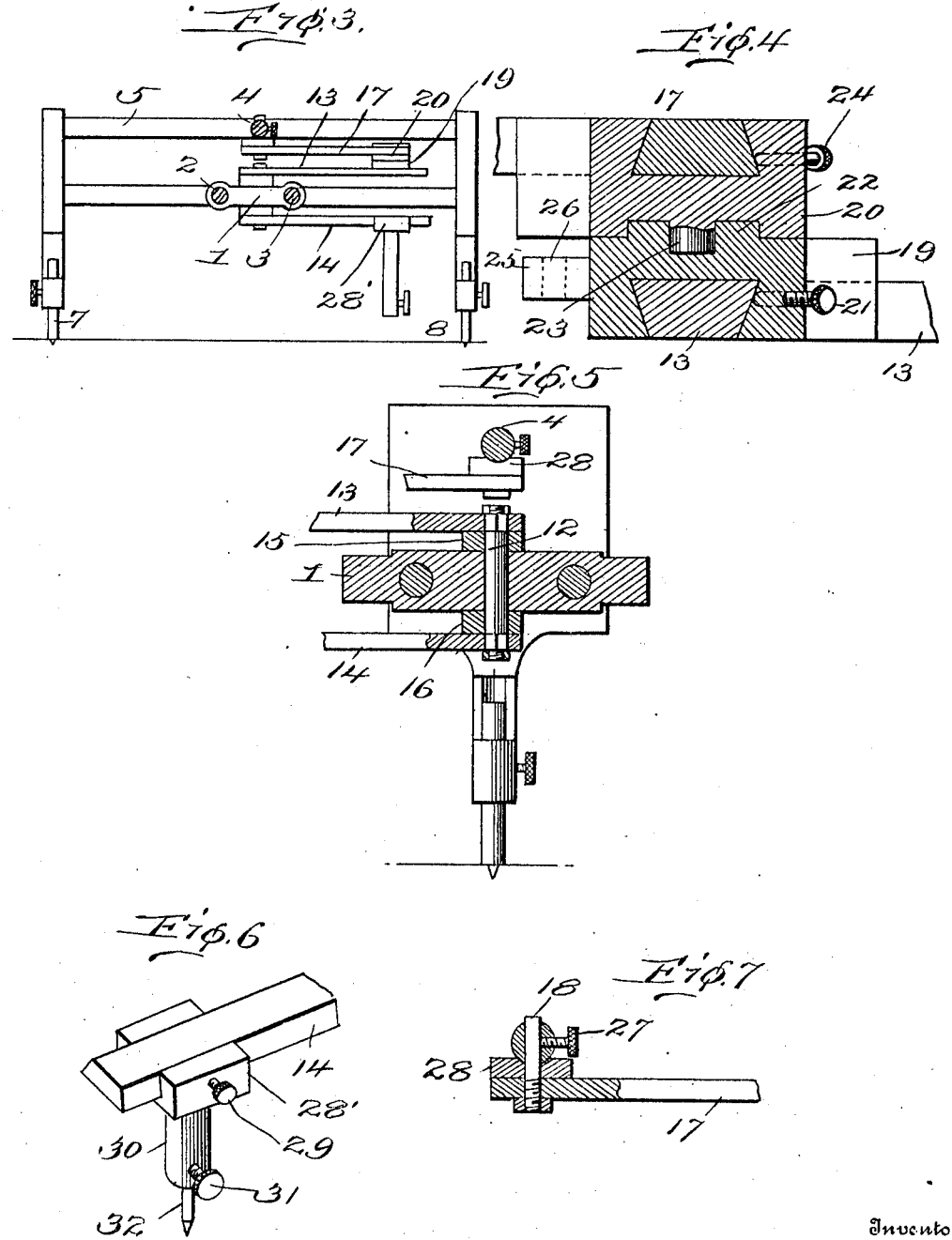

JOHN R. SHEA, OF OSHKOSH, WISCONSIN.

ELLIPSOGRAPH.

957,114.

Specification of Letters Patent.

Patented May 3, 1910.

Application filed April 15, 1908. Serial No. 427,206.

*To all whom it may concern:*

Be it known that I, JOHN R. SHEA, citizen of the United States, residing at Oshkosh, in the county of Winnebago and State of Wisconsin, have invented certain new and useful Improvements in Ellipsographs, of which the following is a specification.

This invention relates to improvements in ellipsographs, and has for an object the provision of a construction in which a marking instrument may be moved for forming an ellipse upon the reciprocation of a sliding support.

Another object in view is the provision of a structure having supports connected by a plurality of bars upon which is mounted a sliding reciprocating member connected with a marking instrument, and means for causing the marking instrument to travel in an ellipse upon the reciprocation of said slide upon its supporting bars.

With these and other objects in view the invention comprises certain novel constructions, combinations and arrangement of parts as will be hereinafter more fully described and claimed.

In the accompanying drawing: Figure 1 is a side elevation of one embodiment of the invention. Fig. 2 is a top plan view of the structure shown in Fig. 1. Fig. 3 is a section through Fig. 2 on line 3—3. Fig. 4 is an enlarged section through Fig. 2 approximately on line 4—4. Fig. 5 is an enlarged sectional view through Fig. 2 on line 5—5. Fig. 6 is an enlarged detail fragmentary perspective view of the outer end of the marking arm and its associated parts. Fig. 7 is an enlarged detail fragmentary sectional view approximately on line 7—7 of Fig. 2.

In constructing an ellipsograph according to the present invention the same is made with any desired kind of supporting members for supporting a plurality of bars that connect the respective ends. The ends or supporting members are preferably constructed with means for varying the height of the bar connecting the same so as to permit the device to work at various heights. Bars connecting the respective ends of the apparatus are preferably three in number, two acting as runners or guides for a slide or reciprocating member and the other as a support for a pivotally mounted arm. The slide mounted on the bars connecting the respective ends of the device carries a pair of pivotally mounted arms that are rigidly connected together so that when one arm moves the other will move in the same direction and to the same degree. One of the arms that is pivotally mounted upon the reciprocating slide is also pivotally connected with the arm that is pivotally mounted upon the upper cross bar, the pivotal connection between the same being adjustable so as to vary the throw of the respective arms. By thus constructing an apparatus having a pivotally mounted arm on a stationary support and a pair of pivotally mounted arms on a reciprocating support with various means connecting all of the arms an apparatus is presented that will cause a marking member mounted on one of the arms to describe an ellipse upon the reciprocation of the reciprocating slide. The marking member is arranged to be adjusted upon its supporting arm, and the remaining arms are pivotally connected together by means that may be adjusted longitudinally of their respective arms for varying the degree and size of the ellipse.

In order to more clearly disclose my invention I have shown in the accompanying drawings a preferred embodiment of the same in which 1 indicates a reciprocating slide that reciprocates or moves upon a pair of runners or guides 2 and 3 that form a frame when taken with an upper rod 4 and supporting members 5 and 6. The end supporting members 5 and 6 are provided with adjustable points or supporting legs 7, 8 and 9 that are held in place by means of suitable clamping set screws. The cross bars 2, 3 and 4 are preferably constructed rounded in cross section as clearly seen in Fig. 5, though other shapes of bars may be secured, the rounded construction being preferable because of the ease with which the same may be constructed. Slide 1 which is adapted to reciprocate upon bars 2 and 3 is formed with hand holds 10 and 11 and with an aperture passing centrally therethrough which is adapted to accommodate a shaft 12. Shaft 12 is squared at the ends for accommodating square openings in arms 13 and 14 so that when either arm is moved movement will be communicated through shaft 12 to the opposite arm. Suitable nuts are provided on the ends of shaft 12 for holding arms 13 and 14 in position on the squared part of shaft 12 and spacing washers 15 and 16 prevent the arms from striking against slide 1. In this manner the arms 13 and 14 are pivotally mounted upon slide 1, but by reason of the mounting of slide 1 upon bars 3 and 4 the pivotal point of the arms, namely, shaft 12, is always in a line directly below bar 4, as also is the pivotal point of arm 17 which is incidentally shaft 18. Arm 13 is, as just stated, pivotally mounted on slide 1 and is also pivotally connected to arm 17 by means of slides 19 and 20 which are pivotally connected. Slide 19 (Fig. 4) is slidably mounted upon arm 13 and may be clamped to arm 13 by a set screw 21 if desired to prevent accidental movement. The slide 19 is formed with a stud 22 having a socket therein into which socket is positioned a pivotal member 23 projecting from slide 20. Slide 20 is also formed with a recess into which stud 22 is adapted to fit, the stud and its co-acting recess being circular in order to permit a free pivotal movement of the respective slides 19 and 20. Slide 20 is also adapted to be reciprocated upon its supporting arm 17 and may be clamped to arm 17 by set screw 24 whenever desirable. Slide 19 is preferably provided with a projection 25 that has formed therein an aperture 26 into which a pin may be fitted for use as a hand hold in moving the slide or if desired simply the projection 25 may be used as a hand hold in moving the slide. By this means arms 13 and 17 are pivotally secured together and by reason of the adjustability of the slides on their supporting arms the action of the respective arms in causing the marking instrument hereinafter fully described to form an ellipse may be varied. Arm 17 is also pivotally connected to bar 4 by means of a shaft 18 that is held in place by a set screw 27. Shaft 18 may be positioned at any point along bar 4, but preferably is positioned midway between the ends 5 and 6. The washer or plate 28 is positioned between arm 17 and bar 4 in order to form a good bearing surface for the end of arm 17, and to prevent the arm from striking against bar 4 as the arm moves on its pivot. As will be observed arm 17 has one end pivotally secured to a stationary member, and has mounted on the opposite end a slide which in turn is pivotally secured to another slide that is adapted to reciprocate upon a second arm; namely, arm 13 so as to give the effect of the securing together of arms 13 and 17.

Arm 14 is rigidly secured to shaft 12 as heretofore set forth and is adapted to support a marking instrument that will be hereinafter known as the marker arm. On the marker arm 14 is positioned a slide 28' that may be locked or clamped in position by means of a set screw 29 so as to prevent any further movement of the slide. Depending from slide 28' is a stem 30 formed hollow for receiving a marking instrument, pen or pencil as may be desired. A set screw or clamping member 31 is arranged for clamping and holding the marking instrument in position.

When it is desired to strike an ellipse the apparatus is placed so that bar 4 will be directly above the major axis of the ellipse, or if the space is not convenient for such a position of the apparatus the same may be turned at right angles to the major axis of the ellipse and the slides 19 and 20 so adjusted as to cause the marking instrument to ascribe an ellipse with the major axis at right angles to bar 4. After the device has been placed in position slide or reciprocating member 1 is moved along bars 2 and 3 to its extreme position near each end of the device and then brought to rest at its starting point. For instance, if the device was set as shown in Fig. 2 slide 1 would be moved toward end 6 until the slide had reached its farther limit in that direction and arm 13 forms an extension to arm 17. The marker would then be forced by the operator forward in its movement in order to permit slide 1 to move back toward end member 5. Slide 1 would be forced as near end member 5 as arms 13 and 17 would permit, and then the operator would force the marking instrument past the dead center point and the slide would be brought back to the starting position. This would complete the ellipse which if the instrument were set as seen in Fig. 2 would have its major axis positioned directly below bar 4. The reciprocating slide 1 would be then reciprocated or moved as just set forth one complete cycle for causing arm 17 to make one complete turn around its pivotal point. As the marker arm 14 is rigidly connected with arm 13 the movement of arm 14 of course will be the same as arm 13, and consequently when the adjustment of slide 19 has been varied on arm 13 the movement of arm 14 will be correspondingly varied.

The points of the ellipse may be varied by moving the marker slide 28 on its arm 14 toward or from shaft 12. In making ellipses preferably the slide 28' is kept positioned directly below slide 19 though the same is not necessary. If it is desired to make an ellipse with the major axis at right angles to arm 4 slides 19 and 20 are moved on their respective arms toward the respective pivot points of the arms and the slide 28' is left or placed near the outer end of arm 14. In this manner an ellipse may be made in either direction that is, with the major axis positioned directly above bar 4, or at right angles thereto, and in addition by properly adjusting the respective slides on arms 13 and 14 and slides 28' a perfect circle could be struck upon the reciprocation of slide 1, or on the contrary an almost straight line could be made by simply moving the slide 28' until the marking instrument 32 is nearly below shaft 12, and then reciprocate slide 1 upon its supporting bars 2 and 3. In making an ellipse at each extreme movement of slide 1, that is at each time the same approaches the nearest point to which it moves to ends 5 and 6, the movement of arms 13 and 17 must be assisted by the operator pulling on them or upon arm 14 so as to move the respective arms past the dead center caused by arms 13 and 17 taking a position in alinement.

What I claim is:

An ellipsograph comprising a single top bar, a pair of bottom bars, a slide mounted upon the bottom bars and provided with a lateral handhold, an arm pivoted to the top bar, an arm pivotally connected to the slide and connecting the first mentioned arm and the slide, means adjustably secured to both of the arms provided with pivotally interlocking members for connecting the arms for pivotal movement, a marker arm connected with said second mentioned arm and movable therewith, a rotatable shaft carried by the slide and bodily movable therein, and connecting the second mentioned arm and marker arm, and a marker adjustably carried by the marker arm.

In testimony whereof I affix my signature, in presence of two witnesses.

JOHN R. SHEA.

Witnesses:
E. ROY SHOREY,
EMRYS J. LLOYD.